(12) United States Patent
Jolly et al.

(10) Patent No.: US 6,259,802 B1
(45) Date of Patent: Jul. 10, 2001

(54) OBJECT TRACKING TECHNIQUE USING POLYLINE CONTOURS

(75) Inventors: Marie-Pierre Jolly, Bensalem, PA (US); Alok Gupta, East Brunswick; Davi Geiger, New York, both of NY (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 08/885,041

(22) Filed: Jun. 30, 1997

(51) Int. Cl.$^7$ ...................................................... G06K 9/48
(52) U.S. Cl. ........................... 382/103; 382/199; 382/266
(58) Field of Search .................................... 382/199, 103, 382/266, 205

(56) References Cited

U.S. PATENT DOCUMENTS 5,239,591 * 8/1993 Ranganath ........................... 382/199
5,768,413 * 6/1998 Levin et al. ......................... 382/173

OTHER PUBLICATIONS

Vlontzos, J.A, et al., "A MRF Approach to Optical Flow Estimation", IEEE, 1992, pp. 853–856.*
Geiger, D. et al. "Matching Elastic Contours" IEEE, pp. 602–604, 1993.*
Gupta, A. et al. "Cardiac MR Image Segmentation Using Deformable Models", IEEE, pp. 747–750, 1993.*
Ballard et al., "Computer Vision", Prentice Hall, Englewood Cliffs, NJ, 1982, pp. 137–145.
Brassard et al., "Algorithmics Theory and Practice", Prentice Hall, Englewood, NJ, 1988, pp. 87–92.
Geiger et al., "Dynamic Programming for Detecting, Tracking, and Matching Deformable Contours", IEEE Transactions on Pattern Analysis and Machine Intelligence, vol. 17, No. 3, Mar. 1995, pp. 294–302.
Kass et al., "Snakes: Active Contours Models", Int'l Journal of Computer Vision, vol. 2, 1988, pp. 321–331.

* cited by examiner

*Primary Examiner*—Matthew C. Bella
(74) *Attorney, Agent, or Firm*—Donald B. Paschburg

(57) ABSTRACT

A technique of tracking an object of interest in a sequence of images using active polyline contours. An image processor converts a sequence of images into digital image data related to light intensity at the pixels of each image. A computer stores the digital image data and forms an initial polyline that substantially outlines an edge of the object in a first image. The computer forms input polylines for each of the subsequent images which substantially outline the edge in the corresponding images and are derived from the optimal polyline of each previous such image. The computer processes the digital image data, performing a graph exploration procedure that starts with the initial polyline in the first image and the input polylines in the subsequent images. The graph exploration procedure searches polylines in a predefined search space to find the corresponding optimal polylines. The computer evaluates edge strength of the different polylines with respect to the light intensity of its underlying pixels to obtain corresponding contour costs. The polyline with the smallest contour cost is selected as the optimal contour for each of the images. The set of optimal contours are used to track the object of interest.

17 Claims, 6 Drawing Sheets

OBJECT TRACKING TECHNIQUE USING POLYLINE CONTOURS

BACKGROUND OF THE INVENTION

1. Field of the Invention

The invention relates to computer vision techniques and, more particularly, to apparatus and methods for automatically tracking objects contained in image sequences.

2. Description of the Prior Art

In the field of computer vision, active contours have been used to detect and track objects of interest in a sequence of digital images. Computer systems capable of tracking active contours have been successfully used to perform a variety of image processing tasks, such as deleting, enhancing, coloring, reshaping or otherwise modifying selected objects in digital images according to some predetermined criteria. Although contour tracking systems have served the purpose, they have not proved entirely reliable in many image processing applications where it is necessary to track complex, deformable and/or articulated objects.

Active contour tracking essentially involves the process of segmenting a first image into separate regions and then tracking these regions through time from a sequence of similar images. Segmenting a digital image, which typically comprises an array of pixels, involves the process of identifying which pixel belongs to which region. Data is then generated which identifies sets of pixels that represent a contour that approximately outlines a distinct feature, such as an edge or a ridge, that defines the regions of interest. In many applications, the regions may be relatively uncomplicated and can be approximated with simple geometric shapes, such as circles, rectangles, ellipses, or others. However, since many natural objects cannot be described by simple geometric shapes, techniques have been developed to represent an edge or a ridge on these objects with more complex contours than those simple shapes. One important prior art technique for modeling complex shapes with active contours involves the use of "snakes." The following article describes a snake technique in detail: Kass et al, "Snakes: Active Contour Models," *International Journal of Computer Vision*, Vol. 2, pp 321–331, 1988.

In general, a snake is an energy-minimizing active contour that is guided by external constraint forces and influenced by image forces that pull it toward features of interest such as lines, ridges and edges of an object. A typical energy or cost function for a snake may contain terms that measure the smoothness of the contour and the amount of edge strength along the contour. The goal is to minimize this function to find an optimal contour which is smooth and coincides with high-gradient magnitude points in the image. The Kass et al article proposes to minimize an energy or cost function using Euler equations and gradient descent.

A disadvantage of most snake techniques is that they can be very dependent on the starting points of the contour. The energy or cost minimization processes in snake techniques are usually based solely on gradient descent and are not guaranteed to locate a global minimum of the corresponding function. As a result, neighboring edges can be very distracting to such a process. Hence, depending on the initial contour configuration, different local minima of the corresponding function may be reached, thereby failing to find the optimal contour.

Another image tracking technique involves the use of "level sets", which have been used to model moving boundaries between two regions in physical phenomenon, such as an interface between ice and water at the polar regions, or an interface between fire and grass in a brush fire. In such situations, it is difficult to model the evolution of the contour and prevent the contour from crossing over itself. The level set approach builds an original curve into a surface called a "level set function". Then, instead of moving the curve, the level set function expands, rises and falls. The advantage of this technique is that the level set function is very well behaved; thus, topological changes which break the curve or merge two different curves are handled naturally. Also, this method extends very easily in three dimensions to model moving surface interfaces.

Unfortunately, the level set technique is primarily designed for tracking homogeneous objects. Also, it has been recognized that this technique requires symmetric initialization in the sense that if the initial contour is placed close to part of an object boundary, the contour can cross over that portion before reaching the other portions of the object boundary. In addition, if there are gaps in the object boundary, the level set will pass through the gaps without capturing the object of interest. In level set models, the contour usually slows down around image edges, but it does not come to a complete stop unless the edge is an ideal edge. For real edges, therefore, the contour has to be stopped in an ad-hoc manner.

A popular solution for locating the global optimum of a cost function involves a searching procedure that uses a graph exploration technique. Prior art graph exploration techniques have been primarily applied to extracting objects in a single image. Since it is difficult to model the shape of an object for tracking purposes, graph exploration techniques for contour extraction have had very limited success in tracking applications. Consequently, a need exists for image tracking systems capable of locating the global optimum of a cost function that combines shape and image information for a well defined active contour in an image sequence.

SUMMARY OF THE INVENTION

The present invention satisfies this need by providing an image tracking system, comprising an image sensor and an image processor, for acquiring a sequence of images and for generating digital image data related to light intensity at pixels having coordinates i and j of each of the images. A computer connects to the image sensor and image processor and stores and processes the digital image data to track an object of interest in the sequence of images. The computer comprises an input contour device for defining an input contour (in terms of pixel coordinates i and j) outlining an image characteristic of the object of interest in a first one of the images. The computer also comprises an optimal contour device for processing the digital image data of the images in sequence by performing, for each of the images, a graph exploration procedure to search a predefined search space related to the input contour to find a corresponding optimal contour outlining the object of interest. The computer further comprises an image tracker for storing the optimal contours (again in terms of pixel coordinates i and j) corresponding to the sequence of images.

Another aspect of the invention includes an image tracking system comprising an image device for acquiring a sequence of images, converting the images into digital image data related to the light intensity at the pixels of each image, and generating the digital image data. A computer connects to the image device for storing and processing the digital image data to track an object of interest in the sequence of images. The computer then forms an initial contour substantially outlining an image characteristic of the object of interest in a first one of the images. The computer forms input contours for each of the images subsequent to the first one of the images. Each of the input contours substantially outline the image characteristic in corresponding ones of each image. The computer processes the digital image data of the images in sequence by performing, for each image, a graph exploration procedure that starts with the initial contour in the first one of the images and with a corresponding one of the input contours in the images subsequent to the first one of the images, to search different contours in a predefined search space to find a corresponding optimal contour outlining the object of interest in each image. An image tracker forms a set of the optimal contours outlining the image characteristic of the object of interest in the sequence of images and stores the pixel coordinates of the set of optimal contours.

Still, another aspect of the invention includes a method of tracking an object of interest in a sequence of images comprising the steps of: acquiring a sequence of images; converting the sequence of images into digital image data related to the light intensity at the pixels of each image; storing the digital image data; forming an initial contour substantially outlining an image characteristic of the object of interest in a first one of the images; forming input contours for each of the images subsequent to the first one of the images, each input contour substantially outlining the image characteristic in corresponding ones of each image; processing the digital image data of the images in sequence by performing, for each image, a graph exploration procedure, starting with the initial contour in the first one of the images and with a corresponding one of the input contours in the images subsequent to the first one of the images; searching different contours in a predefined search space to find a corresponding optimal contour outlining the object of interest in each image; forming a set of the optimal contours outlining the image characteristic of the object of interest in the sequence of images; and finally storing the pixel coordinates of the set of optimal contours.

A more specific aspect of the invention includes a technique of tracking an object in a sequence of images using active polyline contours. An imaging apparatus converts a sequence of images into digital image data related to the light intensity at the pixels of each image. A computer stores the digital image data and forms an initial polyline that substantially outlines an edge of the object in a first image. The computer forms input polylines for each of the subsequent images which substantially outline the edge in the corresponding image and are derived from the optimal polyline of the previous image. The computer processes the digital image data, performing a graph exploration procedure that starts with the initial polyline in the first image and the input polylines in the subsequent images. The graph exploration procedure searches polylines in a predefined search space to find the corresponding optimal polylines. The computer assigns groups of pixels enveloping vertices of the initial and input polylines to form the predefined search space for each image. The computer evaluates an edge strength of the different polylines with respect to the light intensity of its underlying pixels to obtain corresponding contour costs. The computer evaluates the contour cost by calculating an image cost that is a function of the gradient magnitude and gradient direction of the image intensity. The computer further evaluates the contour cost by calculating a deformation cost that is a function of a stretching cost and a bending cost for the different polylines with respect to preceding ones of the images. The polyline with a smallest contour cost is selected as the optimal contour for each of the images. The set of optimal contours are used to track the object of interest.

BRIEF DESCRIPTION OF THE DRAWINGS

The teachings of the present invention can be readily understood by considering the following detailed description in conjunction with the accompanying drawings, in which.

To facilitate reader understanding, identical reference characters have been used to denote those elements that are common to various figures.

DETAILED DESCRIPTION OF THE PREFERRED EMBODIMENT

Figure 1:
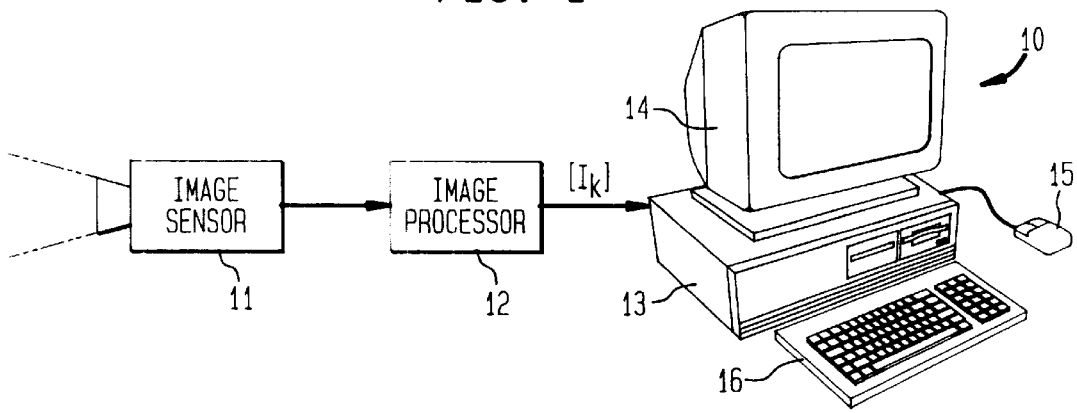
FIG. 1 is a block diagram of a computer vision system for performing image tracking using polyline contours in accordance with the present invention.
Figure 2A:
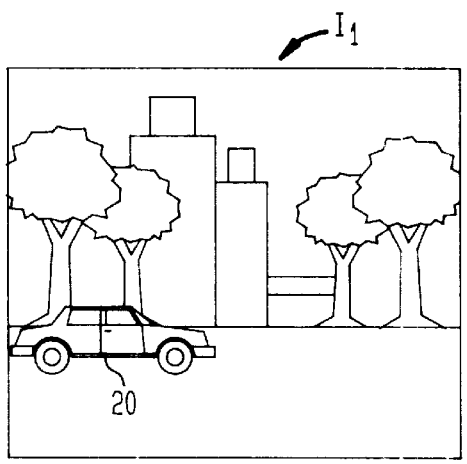
FIGS. 2A–2D represent a digital image sequence of four images in which an automobile moves from left to right across the image sequence.
Figure 2B:
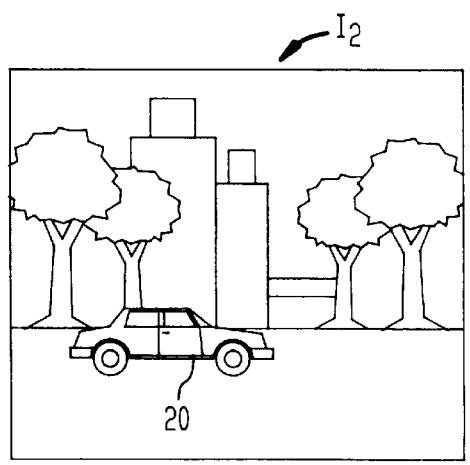
Figure 2C:
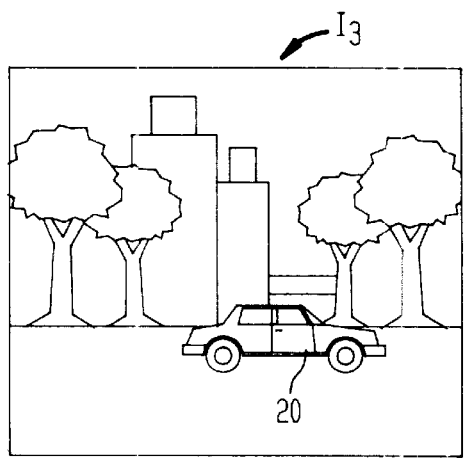
Figure 2D:
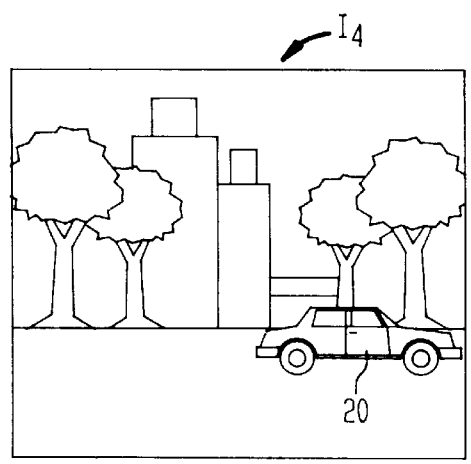

Referring now to the drawings, FIG. 1 illustrates computer vision system 10 which acquires, interprets and processes visual information captured by image sensor 11. Image sensor 11, which may be a television camera, an X-ray tube, an infrared image sensor, or other conventional image sensing device, transmits analog video signals to image processor 12. In response, image processor 12 outputs image sequence [$I_k$], k=1, 2, . . ., K, with each digital image $I_k(i,j)$ formatted as digitized gray-scale data. As such, each digital image $I_k(i,j)$ comprises a set of pixels arranged in a rectangular array of rows (i) and columns (j), with each such pixel having a gray-scale value representing light intensity, I, at that pixel. For instance, conventional digital images often contain a 512-by-512-pixel display coded in an 8-bit format to provide 256 different possible levels of intensity I per pixel. Image processor 12 transmits the gray-scale data to computer 13 for further processing including tracking preselected objects of interest in digital image sequence [$I_k$]. FIGS. 2A–2D depict an illustrative image sequence containing four digitized gray-scale images identified respectively as images $I_1$–$I_4$ (most practical applications would involve a substantially greater number of images). A user interacts with computer 13 via monitor 14, mouse 15 and keyboard 16.

Figure 3:
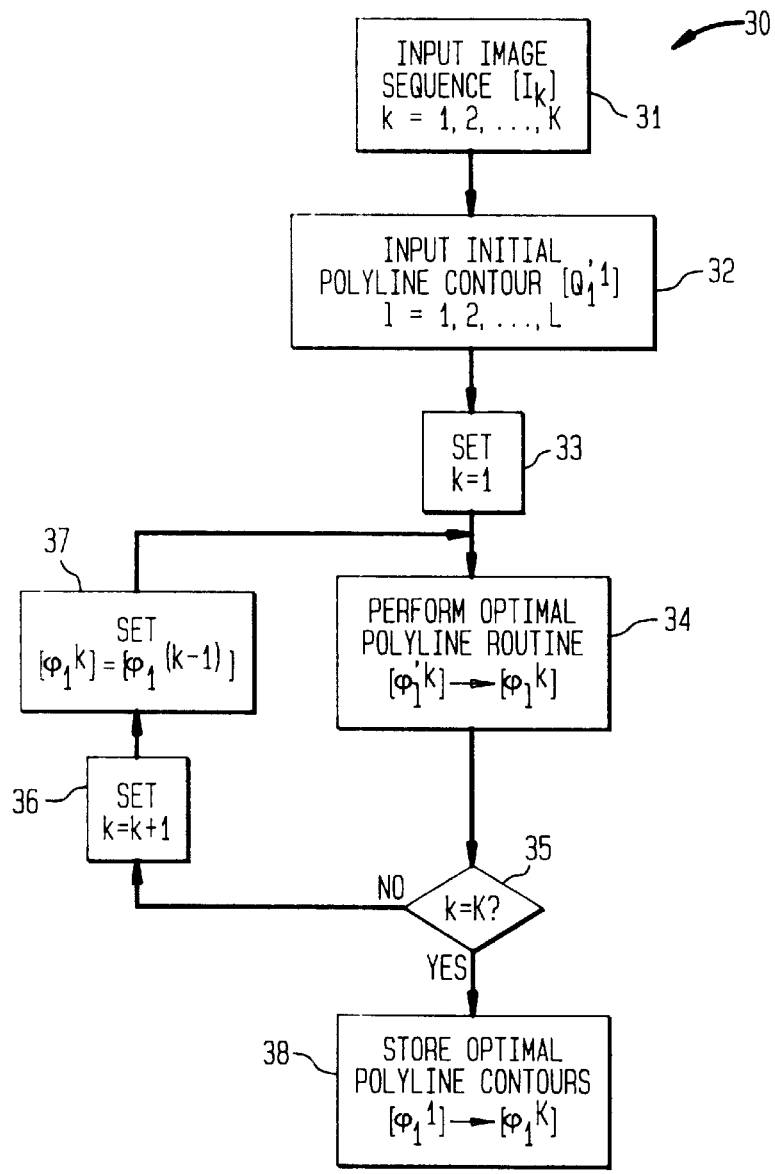
FIG. 3 is a high-level flow chart illustrating an image tracking process of the present invention.

FIG. 3 depicts a high-level flow diagram of image tracking process 30, which computer 13 executes when tracking a designated object of interest in image sequence $[I_k]$. For example, a user may wish to track automobile 20 as it moves from left to right, starting with image $I_1$ of FIG. 2A and ending with image $I_4$ of FIG. 2D. In that regard, the user may wish to track the automobile for purposes of producing a modified image sequence with the automobile deleted from the images, or enhanced to make the automobile more noticeable than otherwise. Other applications of image tracking process 30 will become evident from the following description. To simplify understanding, the reader should simultaneously refer to FIGS. 2–4 throughout the following discussion.

Figure 4:
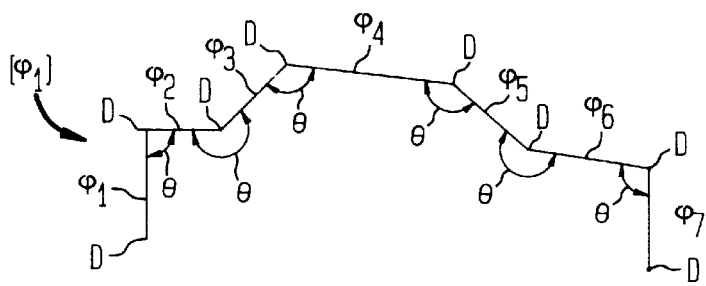
FIG. 4 is an active polyline contour for use in tracking objects of interest in accordance with the image tracking process of FIG. 3.

Image tracking process 30 models an object being tracked in image sequence $[I_k]$ with active polyline contours $[\phi_l^k]$, where l=1, 2, ..., L. In general, a polyline comprises a series of straight lines, called line segments, joined at their ends to usually form an open polygon. Polyline contour $[\phi_l]$, where l=1, 2, ..., L, comprises a polyline having a series of line segments that together outline an object of interest in an image. The specific polyline contour $[\phi_l]$ depicted in FIG. 4 comprises seven line segments, $\phi_1$–$\phi_7$, illustratively shown in outine form of automobile 20. Polyline contour $[\phi_l]$ is said to have vertices D, which are located at the end points and intersections of line segments $\phi_1$–$\phi_7$. Additionally, FIG. 4 shows line segments $\phi_1$–$\phi_7$ forming angles, generally depicted as θ, at their intersections. The shape, size and location of active polyline contour $[\phi_l^k]$ in digital image $I_k(i,j)$ may be completely specified by the pixel coordinates (i,j) of vertices D.

The goal of image tracking process 30 is to start with initial polyline contour $[\phi'_l{}^1]$ the prime symbol is used to designate that an item is an input) from first image $I_1$ and then locate a corresponding optimal polyline contour $[\phi_l^k]$ in each of the following images $I_k$, knowing that the object shape might not be exactly the same in each image, since a two-dimensional polyline contour is usually a projection of a three-dimensional object in the scene and since the image is digitized. Additionally, in many cases the object being tracked is deformable and/or contains articulated parts, which may further cause the physical dimensions of the object to change from image-to-image.

Image tracking process 30 of FIG. 3 begins with successive input STEPS 31 and 32. Image processor 12 performs input STEP 31 when applying image sequence $[I_k]$ to computer 13 as described above with respect to FIG. 1. Next, a user performs input STEP 32 by selecting an object to be tracked in image sequence $[I_k]$. Specifically, in STEP 32, the user causes computer 13 to display first image $I_1$ of stored image sequence $[I_k]$ on monitor 14. The user then designates an object to be tracked by constructing initial polyline contour $[\phi'_l{}^1]$ for first image $I_1$ on monitor 14. When constructing initial polyline contour $[\phi'_l{}^1]$, the user essentially outlines a prominent feature of the object, such as a sharp edge or a ridge on the object, which, in the judgment of the user, can be used to track the object of interest. The user may construct initial polyline contour $[\phi'_l{}^1]$ by using mouse 15 and/or keyboard 16 to visually select corresponding input vertices D' of first image $I_1$ on monitor 14. For example, a user may display image $I_1$ of FIG. 2A on monitor 14 and then manually select vertices D' by pointing and clicking mouse 15 at the corners of automobile 20. In response, computer 13 saves the set of pixel coordinates (i,j) of input vertices D'. Then, using initial polyline contour $[\phi'_l{}^1]$ as a starting point, image tracking process 30 invokes STEPS 33–37 to automatically track the selected object (automobile 20) in image sequence $[I_k]$.

In STEP 33, computer 13 sets image index k to a value one. This causes image tracking process 30 to process first image $I_1$ in STEP 34. With k equal to one in STEP 34, computer 13 performs an optimal polyline routine using initial polyline contour $[\phi'_l{}^1]$ as a starting point to search for optimal polyline contour $[\phi_l^1]$ in first image $I_1$. FIGS. 5–8 show the details of the optimal polyline routine of STEP 34. In general, the optimal polyline routine of STEP 34 employs a graph exploration procedure (see search STEP 44 shown in FIG. 5 and detailed in FIG. 7) that searches predefined search spaces SS to find optimal polyline contour $[\phi_l^k]$ corresponding to input polyline contour $[\phi'_l^k]$.

After performing the optimal polyline routine for first image $I_1$ in STEP 34 shown in FIG. 3, image tracking process 30 proceeds to decision STEP 35 where the value of index k is examined. If, in STEP 35, k was determined to equal K, meaning that STEP 34 has processed all images in image sequence $[I_k]$, image tracking process 30 proceeds, via yes path (Y) of decision STEP 35, to store STEP 38. Consequently, after finding optimal polyline contour $[\phi_l^k]$ during successive iterations of STEP 34, computer 13 saves a complete set of optimal polyline contours $[\phi_l^1]$–$[\phi_l^K]$ for all images in image sequence $[I_k]$ in store STEP 38 by storing pixel coordinates (i,j) for vertices D of each optimal polyline contour $[\phi_l^k]$.

However, if k does not equal K in decision STEP 35, image tracking process 30 exits STEP 35 via its no path (N) and invokes set STEP 36, incrementing k to a value of k+1. Next, computer 13 invokes set STEP 37, setting input polyline contour $[\phi'_l^k]$ equal to optimal polyline contour $[\phi'_l^{k-1)}]$, which the optimal polyline routine will use in STEP 34. In other words, when processing an image in STEP 34, image tracking process 30 starts either with initial polyline contour $[\phi'_l{}^1]$, for the first iteration of STEP 34, or with the optimal polyline contour that was found when processing the previous image. Image tracking process 30 continues to perform STEPS 34–37 in seriatim until such time that last image $I_K$ has been processed in STEP 34. For each optimal polyline contour $[\phi_l^k]$ found in STEP 34, computer 13 stores image tracking data. Specifically, after finding optimal polyline contour $[\phi_l^k]$ for each image $I_k$, computer 13 saves the set of optimal polyline contours $[\phi_l^1]$–$[\phi_l^k]$, in store STEP 38, as a set of pixel coordinates (i,j) of the corresponding vertices D, and the corresponding image number k.

Figure 5:
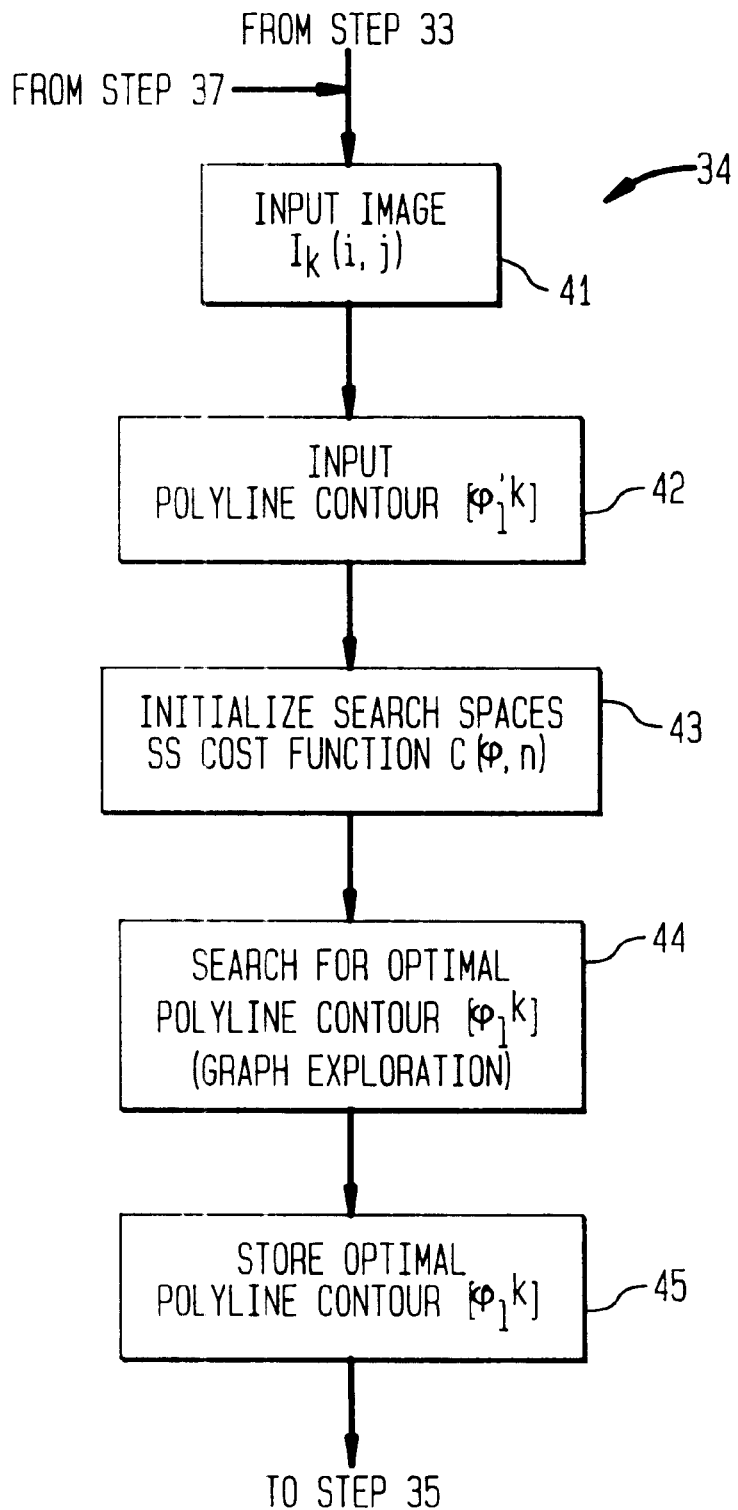
FIG. 5 is a high-level flow chart illustrating an optimal polyline routine which forms a part of the image tracking process of FIG. 3.

With reference to FIG. 5, the optimal polyline routine of STEP 34 begins with successive input STEPS 41 and 42. In input STEP 41, computer 13 selects and obtains a specific digital image $I_k(i,j)$ for processing. Next, in input STEP 42, computer 13 obtains a corresponding input polyline contour $[\phi'_l^k]$, which image tracking process 30 has selected in accordance with STEPS 32 or 37 as described above.

Computer 13 next initializes, in STEP 43, a set of search spaces SS(1)–SS(L+1) and polyline cost function C(φ,n), where n is a group index for line segments φ in a polyline. The initialized search spaces SS(1)–SS(L+1) and polyline cost function C(φ,n) are used in search STEP 44 to search for optimal polyline contour $[\phi_l^k]$. As indicated in FIG. 5, search STEP 44 involves the use of a graph exploration procedure that is described in detail with respect to FIGS. 7 and 8. Thus, computer 13 performs search STEP 44, shown in FIG. 5, using digital image $I_k(i,j)$ and corresponding input polyline contour $[\phi'_l^k]$ that were input in respective input STEPS 41 and 42. Computer 13 also uses search spaces SS(1)–SS(L+1) and polyline cost functions C(φ,n) that were initialized in STEP 43. Computer 13 saves each optimal polyline contour $[\phi_l^k]$ in store STEP 45 and then returns to decision STEP 35 of FIG. 3.

Figure 6:
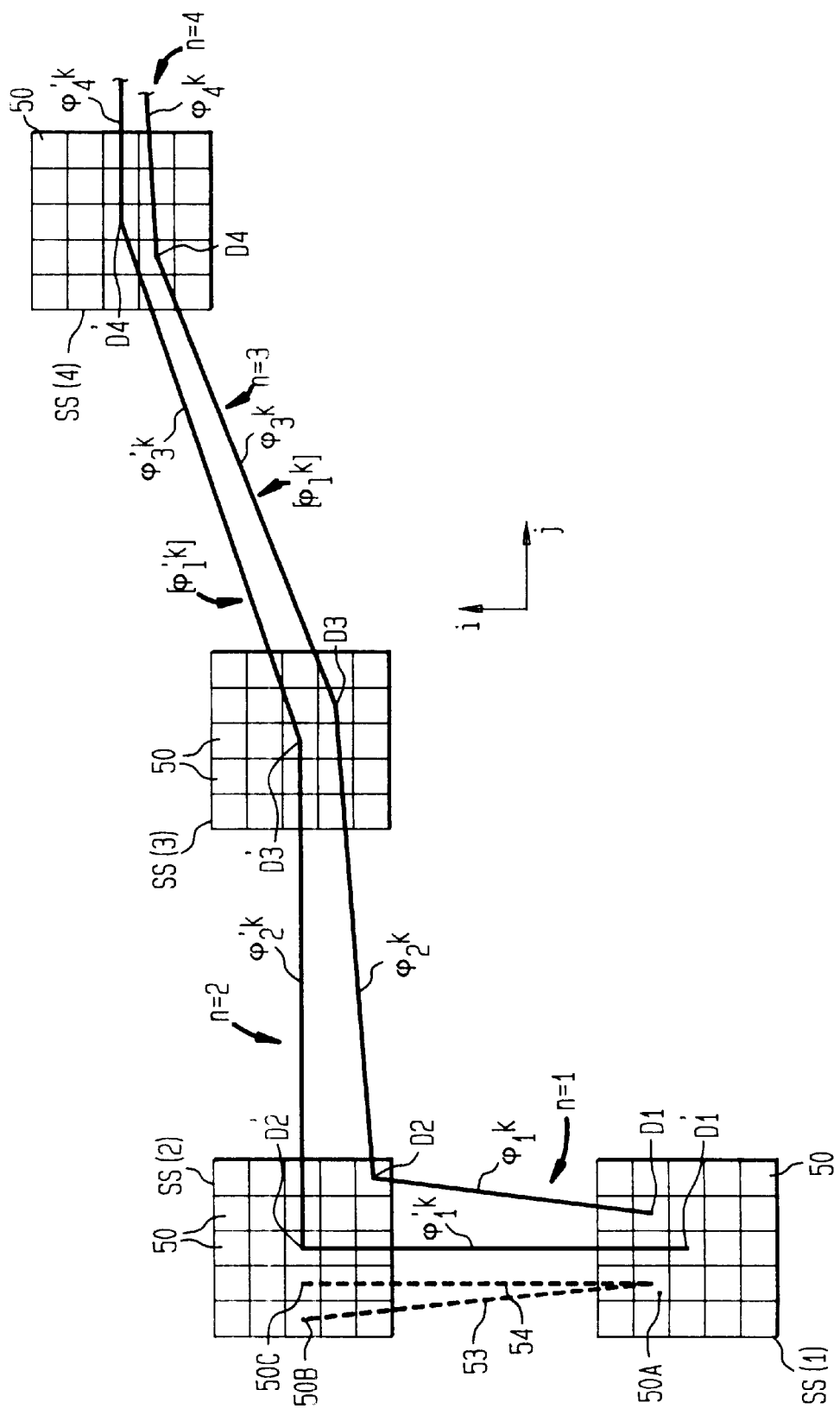
FIG. 6 is a polyline corresponding to a portion of the polyline contour shown in FIG. 4.

FIG. 6 shows an enlarged polyline which corresponds to a portion of the polyline contour shown in FIG. 4.

Specifically, FIG. 6 illustrates a first polyline made up of input line segments $\phi'^{k}_{1}, \phi'^{k}_{2}, \phi'^{k}_{3}$ and $\phi'^{k}_{4}$ which correspond respectively to line segments $\phi_1, \phi_2, \phi_3$ and $\phi_4$ shown in FIG. 4 for automobile 20 of FIGS. 2A–2D. In the FIG. 6 illustration, line segments $\phi'^{k}_{1}, \phi'^{k}_{2}, \phi'^{k}_{3}$ and $\phi'^{k}_{4}$ represent the first four line segments of an input polyline contour $[\phi'^{k}_{l}]$ of the type output by STEPS 32 and 37 in image tracking process 30 of FIG. 3. Further, FIG. 6 also illustrates a second polyline corresponding to line segments $\phi^{k}_{1}, \phi^{k}_{2}, \phi^{k}_{3}$ and $\phi^{k}_{4}$, which make up the desired optimal polyline contour $[\phi^{k}_{l}]$ being searched for and generated as output by search STEP 44.

In initialize STEP 43 of FIG. 5, computer 13 constructs a search space for each input vertex D' of input polyline contour $[\phi'^{k}_{l}]$. FIG. 6 illustrates four such search spaces SS(1)–SS(4), which computer 13 constructed by assigning four groups of pixels 50 in square arrays to surround input vertices D1'–D4'. It is noted that FIG. 6 shows only those pixels 50 that have been assigned to search spaces SS(1)–SS(4); pixels associated with the remainder of the image have been omitted for clarity.

Search spaces SS(1)–SS(L+1) are each centered about its corresponding vertex D. For instance, search space SS(1) comprises a 5-by-5 pixel array for a total of 25 pixels 50 with vertex D1' located at the center of the array. Computer 13 centers search spaces SS(2)–SS(4) in a similar manner with respect to the corresponding input vertices D2'–D4'.

In addition to establishing search spaces in initialize STEP 43, computer 13 also initalizes polyline cost functions $C(\phi,n)$. Polyline cost functions $C(\phi,n)$ comprise mathematical relationships made up of cost components primarily related to the specific image features selected by the user. As indicated above, active polyline contours may be used to track image features such as an edge, a ridge, a texture, or similar characteristic.

In the case of edge tracking, polyline cost function $C(\phi,n)$ essentially includes two components of cost, namely, an image cost and a deformation cost. The image cost combines edge magnitude and edge direction information for a particular line segment with respect to an edge in an image. The deformation cost combines stretching and bending information with respect to successive images. The image cost $e_1(\phi)$ for one line segment is defined as follows:

$$e_1(\varphi) = \frac{1}{U(\varphi) + \varepsilon} \tag{1}$$

where:

$$U(\varphi) = \frac{\sum_{(i,j)\in\varphi} \left[\|\nabla I\|(i,j)h(\vec{\varphi}\cdot\vec{\nabla}I(i,j))\right]}{\sum_{(i,j)\in\varphi} 1}; \tag{2}$$

$\varepsilon$ is an arbitrarily small positive number that is added to $U(\phi)$ to prevent the denominator of Equation (1) from being zero;

$\|\nabla I\|(i,j)$ is the gradient magnitude of I, i.e., $$\|\nabla I\|(i,j) = \left[\left(\frac{\partial I}{\partial i}\right)^2 + \left(\frac{\partial I}{\partial j}\right)^2\right]^{1/2}; \tag{3}$$

$\vec{\phi}$ is a unit vector in the direction of $\phi$;

$\vec{\nabla}I(i,j)$ is a unit vector of the gradient direction of I such that $$\vec{\nabla}I(i,j) = \tan^{-1}\left(\frac{\frac{\partial I}{\partial j}}{\frac{\partial I}{\partial i}}\right); \text{ and} \tag{4}$$

$$h(x) = \begin{cases} 1 - |x| & -1 \le x \le 1 \\ 0 & \text{elsewhere} \end{cases} \tag{5}$$

where:

$$x = (\vec{\phi} \times \vec{\nabla}I(i,j)). \tag{6}$$

Image cost $e_1(\phi)$ essentially evaluates edge strength of line segment $\phi$ with respect to its underlying pixels 50. The first term in the summation in the numerator of Equation (2), $\|\nabla i\|(i,j)$, represents the magnitude of the illumination gradient at an underlying pixel 50 having coordinates (i,j), while the second term, $h(\vec{\phi}\times\vec{\nabla}I(i,j))$, represents function $h(x)$, where x is a dot product of unit vector $\vec{\phi}$ with unit vector $\vec{\nabla}I(i,j)$. Function $h(x)$, which is defined in equation (5), equals one whenever the dot product x equals zero, which occurs when the direction of the illumination gradient is perpendicular to line segment $\phi$. The sum in the denominator of equation (2) represents the total number of underlying pixels 50, i.e., the number of pixels 50 that coincide with line segment $\phi$ and, therefore, are involved in the summations.

Consequently, as seen from Equation (2), $U(\phi)$ will tend to be larger the closer that the illumination gradient $\vec{\nabla}I$ is to being perpendicular to line segment $\phi$ and the closer line segment $\phi$ is to pixels with high gradient magnitude. Equation (1) shows that as $U(\phi)$ increases, image cost $e_1(\phi)$ decreases. Thus, small values of image cost $e_1(\phi)$ will indicate that the corresponding line segment $\phi$ coincides with underlying pixels 50 that have a strong edge response and have a local linear structure direction that is aligned with that line segment $\phi$.

As discussed above, the deformation cost introduces penalties for stretching and bending of a polyline between two successive images. A penalty for stretching is introduced by stretching cost $e_2(\phi',\phi)$, which compares the amount of stretch between line segment $\phi$ and the corresponding input line segment $\phi'$.

The stretching cost is defined as follows:

$$e_2(\varphi', \varphi) = \frac{(\|\varphi\| - \|\varphi'\|)^2}{\|\varphi\| + \|\varphi'\|}; \tag{7}$$

where:

$\|\phi\|$ is the length of line segment $\phi$; and $\|\phi'\|$ is the length of input line segment $\phi'$.

A penalty for changing angle $\theta$ at vertex D of a polyline is introduced by bending cost $e_3(\phi'_l,\phi'_{(l+1)},\phi_l,\phi_{(l+1)})$, which compares the amount of bending between successive line segments $\phi_l$ and $\phi_{(l+1)}$, and the corresponding input line segments $\phi'_l$ and $\phi'_{(l+1)}$. The bending cost associated with segment $\phi_{(l+1)}$ is defined as follows:

$$e_3(\varphi'_l, \varphi'_{l+1}, \varphi_l, \varphi_{l+1}) = \frac{[\theta(\varphi_l, \varphi_{l+1}) - \theta'(\varphi'_l, \varphi'_{l+1})]^2}{\theta(\varphi_l, \varphi_{l+1}) + \theta'(\varphi'_l, \varphi'_{l+1})} \tag{8}$$

where:

$\theta(\phi_l,\phi_{(l+1)})$ is the angle between successive line segments $\phi_l$ and $\phi_{(l+1)}$; and $\theta'(\phi'_l, \phi'_{(l+1)})$ is the angle between successive input line segments $\phi'_l$ and $\phi'_{(l+1)}$.

Consequently, the total polyline cost of line segment $\phi_{(l+1)}$ connected to line segment $\phi_l$ with respect to corresponding input line segments $\phi'_{(l+1)}$ and $\phi'_l$ is:

$$e(\phi'_l,\phi'_{(l+1)},\phi_l,\phi_{(l+1)}) = e_1(\phi_{(l+1)}) + ae_2(\phi'_{(l+1)},\phi_{(l+1)}) + \beta e_3(\phi'_l,\phi'_{(l+1)},\phi_l,\phi_{(l+1)}). \quad (9)$$

The total cost $C(\phi,n)$ of a polyline extending from search space SS(1) to search space SS(n+1) may be expressed as follows:

$$C(\varphi, n) = \sum_{l=1}^{n} e_1(\varphi_l) + \alpha \sum_{l=1}^{n} e_2(\varphi'_l, \varphi_l) + \beta \sum_{l=2}^{n} e_3(\varphi'_{l-1}, \varphi'_l, \varphi_{(l-1)}, \varphi_l), \quad (10)$$

which is equivalent to:

$$c(\varphi, n) = \sum_{l=1}^{n-1} e_1(\varphi_l) + e_1(\varphi_n) + \alpha \sum_{l=1}^{n-1} e_2(\varphi'_l, \varphi_l) + \alpha e_2(\varphi'_n, \varphi_n) + \beta \sum_{l=2}^{n-1} e_3(\varphi'_{l-1}, \varphi'_l, \varphi_{l-1}, \varphi_l) + \beta e_3(\varphi'_{n-1}, \varphi'_n, \varphi_{n-1}, \varphi_n) \quad (10a)$$

which is equivalent to:

$$c(\phi,n) = c(\phi,n-1) + e_1(\phi_n) + ae_2(\phi'_n,\phi_n) + \beta e_3(\phi'_{n-1},\phi'_n,\phi_{n-1},\phi_n). \quad (10b)$$

For a polyline contour $[\phi_l]$, having L line segments $\phi$, with respect to corresponding input polyline contour $[\phi'_l]$, the total cost $C(\phi,L)$ is:

$$C(\varphi, L) = \sum_{l=1}^{L} e_1(\varphi_l) + \alpha \sum_{l=1}^{L} e_2(\varphi'_l, \varphi_l) + \beta \sum_{l=2}^{L} e_3(\varphi'_{l-1}, \varphi'_l, \varphi_{(l-1)}, \varphi_l). \quad (11)$$

The factors $\alpha$ and $\beta$ in Equations (9, 10 and 11) are weighting factors which a user assigns values depending on the nature of the object being tracked. For instance, in the case of images $I_1$–$I_4$ shown in FIGS. 2A–2D, the edge lengths of automobile 20 and the angles between these edges would be expected to change somewhat while automobile 20 banks and turns as it moves across images $I_1$–$I_4$, since the images are two-dimensional projections of a moving three-dimensional object. Consequently, when tracking automobile 20, the user would assign appropriate values to factors $\alpha$ and $\beta$ (typically in the order of 100 to 200), to account for the degree of expected changes. In contrast, consider the case of tracking objects appearing in an image sequence taken from a satellite, e.g., tracking a highway or a river photographed from an orbiting satellite. In that case, the user would expect that the shapes of the highway and river edges would change very little, if at all, in successive images, in as much as these objects are not moving and are being photographed from a great distance. Consequently, the user would assign significantly higher values to weighting factors $\alpha$ and $\beta$ (e.g., in the order of 1000), thereby imposing a greater deformation penalty cost. For articulating and/or deformable objects, such as the silhouette of a runner, the user would assign significantly lower values to weighting factors $\alpha$ and $\beta$ (in the order of 10), thereby imposing a smaller deformation penalty cost.

The deformation penalties were chosen by comparing a polyline and its component line segments $\phi$ to a flexed version of an average relaxed spring. The stretching penalty described above compares with the energy associated with stretching or compressing a conventional spring. The bending penalty relates to the stiffness of a conventional spring, which is usually assumed to be inversely proportional to its length.

The graph exploration procedure, which computer 13 executes in search STEP 44 of FIG. 5, will now be described in detail while referring in particular to FIGS. 6 and 7. The goal of search STEP 44 is to find optimal polyline contour $[\phi_l^k]$ in each image $I_k$. Optimal polyline contour $[\phi_l^k]$ is defined as that polyline contour in image $I_k$ whose total cost $C(\phi,L)$ (see Equation (11)) is minimized with respect to all possible polyline contours within search spaces SS(1)–SS(L+1). Illustratively, FIG. 6 contains portions of two of the possible polyline contours in search spaces SS(1)–SS(L+1), namely, input polyline contour $[\phi'^k_l]$ and optimal polyline contour $[\phi_l^k]$. There are, of course, a significant number of additional polyline contours that may be drawn through search spaces SS(1)–SS(L+1). Making an exhaustive search of all possible polyline contours within search spaces SS(1)–SS(L+1) to find which one is the optimal polyline contour $[\phi_l^k]$, i.e., the one with the smallest total cost $C(\phi,L)$, is generally impractical because the total number of possible polyline contours within search spaces SS(1)–SS(L+1) is normally quite large.

For example, if each search space contains N pixels, the total number of possible line segments $\phi$ that can extend between two successive search spaces equals $N^2$. Illustratively, in addition to line segments $[\phi'^k_1]$ and $[\phi_1^k]$, FIG. 6 shows two other possible line segments 53 and 54 extending between search spaces SS(1)–SS(2). Line segments 53 and 54 extend from a common pixel 50A in search space SS(1) to two different pixels 50B and 50C in search space SS2. All told, there will be $25^2$=625 different line segments $\phi$ that can be extended between search spaces SS(1) and SS(2) of FIG. 6. Further, when each search space contains N pixels and the polyline contour contains L line segments $\phi$, the total number of line segments $\phi$ within search spaces SS(1)–SS(L+1) will be $LN^2$ and the number of polyline contours with L segments will be $N^L$. Thus, for the example shown in FIGS. 2A–2D and 6, where N equals 25 and L equals seven, the total number of line segments $\phi$ within search spaces SS(1)–SS(8) equals $(7)(25^2)$, a number less than five thousand, while the total number of polyline contours equals $25^7$, a number in excess of six billion! Consequently, the goal of search STEP 44 is to conduct a systematic search using a minimum number of computer computations and a conservative amount of memory to find the set of optimal polyline contours $[\phi_l^1]$–$[\phi_l^K]$ for all images in image sequence $[I_k]$.

Figure 7:
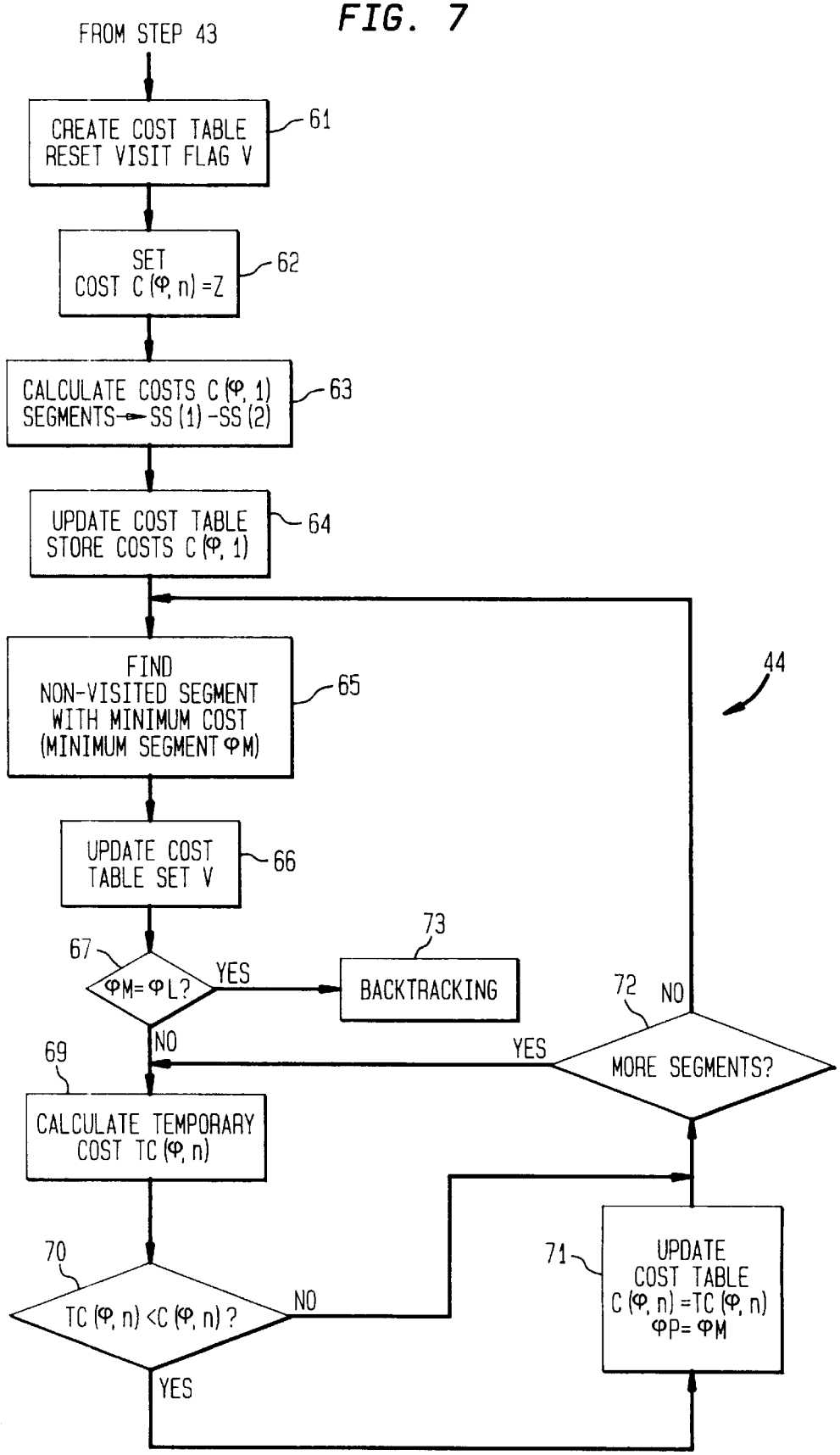
FIG. 7 is a high-level flow chart illustrating a searching procedure using graph exploration which forms a part of the optimal polyline routine of FIG. 5.

Search STEP 44 detailed in FIG. 7 begins with STEP 61 wherein computer 13 creates a cost table that stores cost data for all of the $LN^2$ line segments $\phi$ within search spaces SS(1)–SS(L+1). Each entry of the cost table includes the following data for a different line segment $\phi$:

| DATA ITEM | SYMBOL | DATA DESCPIPTION |
|---|---|---|
| (A) | X(i,j) | start of line segment φ. |
| (B) | Y(i,j) | end of line segment φ. |
| (C) | SS(l) | search space for point X(i,j). |
| (D) | SS(l + 1) | search space for point Y(i,j). |
| (E) | C(φ,n) | cost of polyline that ends with line segment φ in group n. |
| (F) | n | line segment group index. |
| (G) | φP | previous segment. |
| (H) | V | visit flag. |
| (I) | A | line segment number. |

Each entry in the cost table relates to a different one of the LN² possible line segments φ in search spaces SS(1)–SS(L+1). Data item (A), point X(i,j), identifies the coordinates at the start of line segment φ. Data item (B), point Y(i,j), identifies the coordinates at the end of line segment φ. Data item (C) identifies search space SS(l) to which point X(i,j) belongs while data item (D) identifies search space SS(l+1) to which point Y(i,j) belongs. Search space identification data is important here since search spaces may overlap causing one or more pixels to be common to multiple search spaces.

Data item (E) identifies polyline cost C(φ,n) for line segment φ. Data item (F) contains line segment group index n. For instance, line segments extending between search spaces SS(1) and SS(2) belong to the first group (n=1), those extending between search spaces SS(2) and SS(3) belong to the second group (n=2) and so forth. When calculating polyline costs C(φ,n) for a specific line segment in group n, a calculation is made with respect to a line segment in the previous group (n−1); the corresponding line segment in group (n−1) is referred to herein as previous segment φP. Consequently, when storing a particular polyline cost C(φ, n), data item (E), computer 13 also stores the related previous segment φP, data item (G). Because line segments φ in the first group (n=1) have no previous line segment φP, data item (G) for these line segments φ will remain blank. Visit flag V, data item (H), identifies whether or not the corresponding line segment φ has been found to be a minimum segment φM as will be described below with respect to final STEP 65 of FIG. 7. Finally, each table entry has a line segment number A, i.e., data item (I). Consequently, line segment φ may be identified by either the pixel coordinates (i,j) of its end points or its line segment number A.

Referring to FIG. 7, set STEP 62 sets all polyline costs C(φ,n), data items (E), to a value approaching infinity or, more accurately, to a very large number Z that will be greater than the largest expected value of a calculated polyline cost C(φ,n). Calculate STEP 63 calculates polyline costs C(φ,1) for all line segments φ in the first group (n=1), i.e., those line segments extending between search spaces SS(1)–SS(2). In the case where search spaces SS(1) and SS(2) each contain N pixels, there would be a total of N² line segments φ in the first group. Therefore, calculate STEP 63 would perform N² polyline cost C(φ,1) calculations. It is again noted that line segments φ extending between search spaces SS(1) and SS(2) do not have a previous segment φP. The appropriate cost function corresponding to line segments φ in the first group, i.e., those extending between search spaces SS(1)–SS(2), may be calculated using the following Equation (12) which is the sum of Equations (1) and (7):

$$C(\phi,1) = e_1(\phi) + \alpha e_2(\phi',\phi). \tag{12}$$

Update STEP 64 updates data items (E) in the cost table. Specifically, computer 13 replaces the currently stored polyline cost, originally set to the value Z, with the newly calculated polyline costs C(φ,1) obtained in calculate STEP 63. Thus, at this point, data item (E) for each of the N² first-group line segments in search spaces SS(1)–SS(2) will contain a calculated cost C(φ,1), while the remaining table entries will still contain the value Z for data item (E).

In find STEP 65, computer 13 searches all polyline costs C(φ,n) of non-visited table entries, i.e., visit flags V are in a reset state, to find the non-visited line segment φ with the minimum polyline cost C(φ,n). The corresponding line segment is referred to herein as minimum segment φM. In STEP 66, the visit flag V, data item H, is set for the minimum segment φM to indicate that the corresponding line segment was visited.

Computer 13 then executes decision STEP 67 to determine whether or not minimum segment φM, found in the last iteration of find STEP 65, is between the last two search spaces SS(L) and SS(L+1), meaning that its group number n, data item (F), would be L, i.e., φM=φ$_L$. A yes (Y) result in decision STEP 67 causes backtracking STEP 73 (see FIG. 8) to be invoked. A no (N) result in STEP 67 causes computer 13 to proceed to a cost calculation loop that includes STEPS 69–72. For each iteration of calculate STEP 69, computer 13 calculates temporary cost TC(φ,n) for those polylines ending with line segments φ that extend from point Y(i,j) in search space SS(n), i.e., the endpoint of the minimum segment φM found in the last iteration of find STEP 65, to search space SS(n+1). To obtain the necessary temporary polyline cost TC(φ,n) associated with each line segment in group n extending from point Y(i,j), calculate STEP 69 uses Equation (10b).

Decision STEP 70 compares the temporary cost TC(φ,n) calculated in the last execution of calculate STEP 69 to the previously stored polyline cost C(φ,n), data item (E). If the just calculated temporary cost TC(φ,n) is less than the stored polyline cost C(φ,n), the cost table is updated in STEP 71 by placing the value of TC(φ,n) in data item (E), i.e., setting C(φ,n) equal to the just calculated value of TC(φ,n). Additionally, previous segment φP, data item (G), is set equal to the line segment number A of minimum segment φM found in the last execution of find STEP 65. If, in decision STEP 70, the just calculated temporary cost TC(φ, n) is found to be greater than or equal to the previously stored polyline cost C(φ,n), data items (E) and (G) are not changed.

After performing STEPS 70 and possibly 71, decision STEP 72 executes to see whether or not calculate STEP 69 has processed all line segments φ extending from point Y(i,j) of the last found minimum segment φM to search space SS(n+1). If additional line segments φ need to be processed, the cost calculation process returns to calculate STEP 69, via the yes (Y) output of decision STEP 72, and performs another iteration of STEPS 69–72 for another line segment φ. After computer 13 has processed all those line segments φ in group n which extend from point Y(i,j) of the last found minimum segment φM, find STEP 65 is executed. Further iterations of STEPS 65–67 and the cost calculation loop, STEPS 69–72, are then conducted until decision STEP 67 finds that the last found minimum segment φM is in the last group (φM=φ$_L$); at this point the cost table contains sufficient data for backtracking STEP 73 to select the desired optimal polyline contour [φ$_I^k$] for image I$_k$. Consequently, when decision STEP 67 finds that the last found minimum segment φM extends between the last two search spaces SS(L) and SS(L+1), i.e., φM=φ$_L$, backtracking STEP 73 (see FIG. 8) is invoked.

Figure 8:
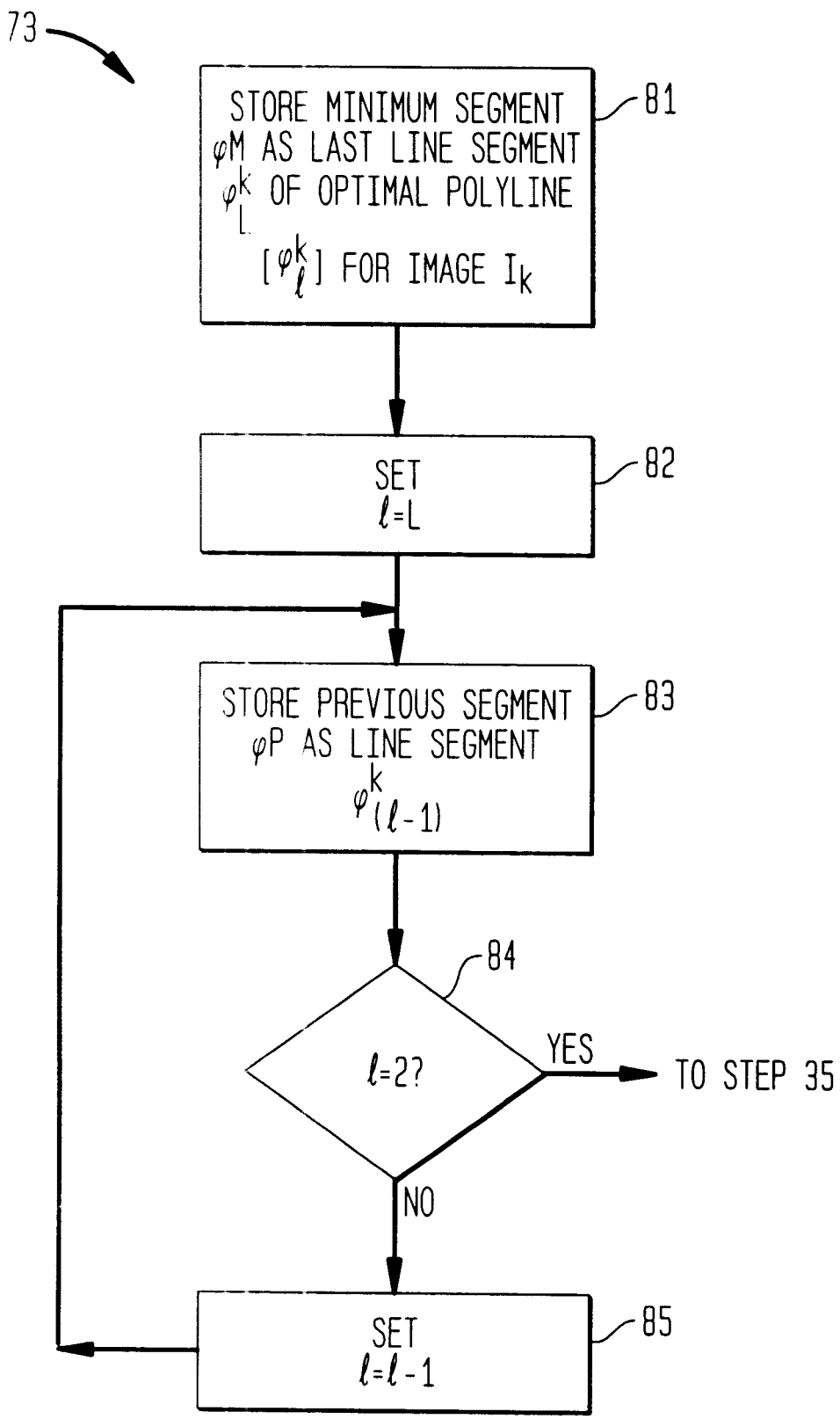
FIG. 8 is a high-level flow chart illustrating a backtracking process which forms a part of the searching procedure of FIG. 7.

Referring to FIG. 8, backtracking STEP 73 selects and stores appropriate line segments φ from the cost table to form the desired optimal polyline contour $[\phi_I^k]$ for image $I_k$. Backtracking STEP 73 selects the necessary set of line segments $\phi_l^k$ by starting with the last line segment $\phi_L^k$ and working toward the first line segment $\phi_1^k$. More specifically, backtracking STEP 73 begins with store STEP 81 wherein the last found minimum segment $\phi M$ is selected and stored as being the last line segment $\phi_L^k$ of the desired optimal polyline contour $[\phi_I^k]$ for image $I_k$. Set STEP 82 next sets l equal to L. Store STEP 83 selects and stores the corresponding previous segment $\phi P$ contained in data item (G) as being the previous line segment $\phi_{(L-1)}^k$.) Decision STEP 84 tests l for the value two. If l does not equal two, l is decremented to the value l−1 in set STEP 85, after which store STEP 83 is again invoked. Since l has been decremented, store STEP 83 again selects and stores a previous segment $\phi P$. At this point, however, the previous segment $\phi P$ selected will be found at data item (G) at the table entry corresponding to the previous segment $\phi P$ that was selected in the previous iteration of store STEP 83. Further iterations will cause store STEP 83 to select a chain of related previous segments $\phi P$ starting with a segment from the last group (n=L) and working toward the front to end with a segment from the first group (n=1). The iteration in which store STEP 83 selects the first line segment $\phi_1^k$, and, therefore, all necessary line segments, will occur when the segment index l equals 2. Consequently, STEPS 83, 84 and 85 are executed serially until such time that decision STEP 84 finds l equal to two, at which time image tracking process 30 returns to STEP 35 (see FIG. 3) for processing the next image $I_{(k+1)}$. As explained above, the complete set of optimal polyline contours $[\phi_I^1]-[\phi_I^K]$ for tracking the selected object in all images of image sequence $[I_k]$ is stored in store STEP 38.

Obviously many modifications and variations of the present invention are possible in the light of the above teachings. For example, while the above description suggests that a user may select the object of interest manually from monitor 14, automated means may be provided for selecting objects and producing initial polyline contour $[\phi'^1_I]$.

It is also noted that the size of search spaces SS is crucial. If a search space is too small, the correct pixel in an image may not be found. If a search space is too large, the execution time may become unacceptable. Additionally, to help alleviate this problem and decrease execution time, a pyramid approach can be used where the image is decreased in size up to a certain level. The polyline is first searched for in the highest level of the pyramid and later brought down to the full resolution image. Further, cost functions associated with other image features, e.g., ridges, gray-level distributions and textures, can be accomodated to solve a particular problem.

It is to be understood, therefore, that within the scope of the appended claims, the invention may be practiced otherwise than as specifically described.

What is claimed is:

1. An image tracking system comprising:
   image means for acquiring a sequence of images, converting said images into digital image data, and outputting said digital image data, said pixels having coordinates i and j;
   computer means connected to said image means for storing and processing said digital image data to track an object of interest in said sequence of images, said computer means comprising:
   means for determining an initial contour substantially outlining an image characteristic of said object in a first image;
   means for determining an input contour for each said image subsequent to said first image using a previous optimal contour or said initial contour;
   means for setting a search space of pixels enveloping a vertex of said initial contour and each said input contour as a predefined search space for each said vertex in each said image;
   means for determining a polyline cost for processing an image cost and a deformation cost, comprising a stretching cost and a bending cost associated with said sequence of images;
   means for determining an optimal contour through processing of said images in said sequence, comprising a graph exploration procedure, which evaluates polyline costs to determine a current optimal contour based on said polyline costs for selecting from a table of previously determined polyline costs, without recalcuation of said previously determined polyline costs, and determining those polyline costs to complete said table of polyline costs with respect to the current sequence, said table being updated with each additional sequence of newly determined polyline costs; and
   means for an image tracking system for forming a set of optimal contours outlining said image characteristic of said object in said sequence of images, and for storing a pixel coordinate i and j of said each set of said optimal contours.

2. The image tracking system of claim 1, wherein said initial contour means forms said initial contour as an initial polyline, said input contour means forms said input contours as input polylines, and said optimal contour means searches different polylines corresponding to said different contours to find optimal polylines corresponding to said optimal contours, said initial polyline, input polylines, different polylines, and optimal polylines defined by said pixel coordinates i and j of their said vertices.

3. The image tracking system of claim 1, wherein means for determining said image cost further comprises:
   means for determining an edge gradient magnitude for evaluating an edge strength of said different polylines with respect to the light intensity of an edge's underlying pixels where said image cost is decreased for said edge with an increased said edge gradient magnitude; and
   means for determining an edge gradient direction for evaluating an edge orientation, where said image cost is decreased for said edge that is nearing perpendicular to said input contour.

4. The image tracking system of claim 1, wherein means for determining said deformation cost further comprises:
   means for determining said stretching cost, imposing a penalty on said deformation cost, particular to said possible polyline, for a shift of a length of said possible polyline from said input polyline contour length; and
   means for determining said bending cost, imposing a penalty on said deformation cost, particular to said possible polyline, for a shift of a angle at said vertex of said possible polyline of the from said input polyline contour angle.

5. The image tracking system of claim 1, wherein the graph exploration procedure further comprises:
   means for determining an image cost calculation that locates said optimum contour;
   means for extracting contours in multiple images in succession; and means for visiting different line segments extending between a pair of search spaces centered on the vertices of polyline contours of said image to determine which set of segments has a minimum overall cost.

6. The image tracking system of claim 1, wherein the graph exploration procedure further comprises:
a table of costs for line segments already calculated within search spaces;
listing the known, least expensive costs for said line segments in said table;
means for examining said table of costs to determine whether said least expensive cost for said line segment between search spaces was determined;
searching said polyline costs of non-visited line segments to find non-visited line segments with a minimum polyline cost;
updating said polyline cost table to include said minimum costs for newly visited line segments; and
calculating said optimum contour for said image using said updated table of least expensive costs.

7. The image tracking system of claim 1, wherein the graph exploration procedure further comprises:
combining shape and image information for an active contour in said image sequence.

8. The image tracking system of claim 1, wherein the graph exploration procedure further comprises:
setting said input contour of a new image as said optimal contour from said previous image.

9. The image tracking system of claim 1, wherein said means for determining a polyline cost calculates said image cost component to determine the magnitude and direction of an edge shape, imposing a penalty on the polyline cost for variations between sequences of images in accordance with the following relationship:

$$e1(\varphi) = \frac{1}{U(\varphi) + \varepsilon};$$

where:
φ is a line segment of said polyline;
e1(φ) is said image cost;

$$U(\varphi) = \frac{\sum_{(i,j)\in\varphi}[\|\nabla I\|(i,j)h(\vec{\varphi}\cdot\vec{\nabla}I(i,j))]}{\sum_{(i,j)\in\varphi}1};$$

I is said light intensity;
ε is an arbitrarily small positive number;
$\|\nabla I\|(i,j)$ is the gradient magnitude of I;
$\vec{\varphi}$ is a unit vector in the direction of φ;
$\vec{\nabla}I(i,j)$ is a unit vector of the gradient direction of I; and $$h(x) = \begin{cases} 1 - |x| & -1 \leq x \leq 1 \\ 0 & \text{elsewhere} \end{cases}$$

where:
$x = (\vec{\varphi} \cdot \vec{\nabla} I(i,j))$.

10. The image tracking system of claim 1, wherein said means for determining a polyline cost calculates a stretching cost component imposing a penalty for variation between sequences of images in accordance with the following relationship:

$$e2(\varphi', \varphi) = \frac{(\|\varphi\| - \|\varphi'\|)^2}{\|\varphi\| + \|\varphi'\|};$$

where:
e2(φ',φ) is said stretching cost;
φ' is an input line segment of said polyline corresponding to said input contour;
$\|\varphi\|$ is the length of said line segment φ; and
$\|\varphi'\|$ is the length of said input line segment φ'.

11. The image tracking system of claim 1, wherein said means for determining a polyline cost calculates a bending cost component imposing a penalty of variation between sequences of images in accordance with the following relationship:

$$e3(\varphi'_l, \varphi'_{(l+1)}, \varphi_l, \varphi_{(l+1)}) = \frac{[\theta(\varphi_l, \varphi_{(l+1)}) - \theta'(\varphi'_l, \varphi'_{(l+1)})]^2}{\theta(\varphi_l, \varphi_{(l+1)}) + \theta'(\varphi'_l, \varphi'_{(l+1)})}$$

where:
e3(φ'$_l$,φ'$_{(l+1)}$, φ$_l$,φ$_{(l+1)}$) is said bending costs;
l=1, 2, . . . , L;
L is the total number of said line segments in said polyline;
θ(φ$_l$,φ$_{(l+1)}$) is the angle between successive line segments φ$_l$ and φ$_{(l+1)}$; and
θ'(φ'$_l$,φ'$_{(l+1)}$) is the angle between successive input line segments φ'$_l$ and φ$_{(l+1)}$.

12. The image tracking system of claim 1, wherein said means for determining a polyline cost calculates a polyline cost by determining the sum of the image cost component, the stretching cost component, and the bending cost component for each line segment in the polyline contour in accordance with the following relationship:

$$C(\varphi, L) = \sum_{l=1}^{L} e1(\varphi_l) + \alpha \sum_{l=1}^{L} e2(\varphi'_l, \varphi_l) + \beta \sum_{l=2}^{L} e3(\varphi'_{l-1}, \varphi'_l, \varphi_{(l-1)}, \varphi_l)$$

where:
C(φ,L) is said contour cost; and
α and β are weighting factors related to the expected relative degree of stretching and bending of said polyline, and said polyline cost means stores said polyline with the smallest polyline cost with respect to each said image as said optimal contour.

13. A method of tracking an object of interest in a sequence of images comprising:
converting said sequence of images into digital image data, comprising pixels, each pixel having coordinates i and j;
forming an initial contour substantially outlining an image characteristic of said object in a first image;
forming input contours for each of said images subsequent to said first image, each said input contour substantially outlining said image characteristic in corresponding images of each said image;
processing said digital image data of said images, in sequence, by performing, for each said image, a graph exploration procedure, which evaluates polyline costs to determine a current optimal contour based on said polyline costs selecting from a table of previously determined polyline costs, without recalculation of said previously determined polyline costs, and determining those polyline costs as to complete said table of polyline costs with respect to the current sequence, updating said table with each additional sequence with newly determined polyline costs;

searching different contours in a predefined search space to find a corresponding optimal contour outlining said object in each said image;

forming a set of said optimal contour outlining said image characteristic of said object in said images; and storing said pixel coordinates i and j of said set of said optimal contours.

14. The method of claim 13, wherein said searching step includes calcuating an image cost to determine the magnitude and direction of an edge shape, imposing a penalty on the polyline cost for variations between sequences of images in accordance with the following relationship:

$$e1(\varphi) = \frac{1}{U(\varphi) + \varepsilon};$$

where:

φ is a line segment of said polyline;

e1(φ) is said image cost;

$$U(\varphi) = \frac{\sum_{(i,j) \in \varphi} [\|\nabla I\|(i,j) h(\vec{\varphi} \cdot \vec{\nabla} I(i,j))]}{\sum_{(i,j) \in \varphi} 1};$$

I is said light intensity;

ε is an arbitrarily small positive number;

∥∇I∥(i,j) is the gradient magnitude of I;

$\vec{\phi}$ is a unit vector in the direction of φ;

$\vec{\nabla}$I(i,j) is a unit vector of the gradient direction of I; and $$h(x) = \begin{cases} 1 - |x| & -1 \le x \le 1 \\ 0 & \text{elsewhere} \end{cases}$$

where:

x=($\vec{\phi} \cdot \vec{\nabla}$I(i,j)).

15. The method of claim 13, wherein searching step includes calculating a stretching cost imposing a penalty for variation between sequences of images in accordance with the following relationship:

$$e2(\varphi', \varphi) = \frac{(\|\varphi\| - \|\varphi'\|)^2}{\|\varphi\| + \|\varphi'\|};$$

where:

e2(φ',φ) is said stretching cost;

φ' is an input line segment of said polyline corresponding to said input contour;

∥φ∥ is the length of said line segment φ; and

∥φ'∥ is the length of said input line segment φ'.

16. The method of claim 13, wherein searching step includes calculating a bending cost imposing a penalty of variation between sequences of images in accordance with the following relationship:

$$e3(\varphi'_l, \varphi'_{(l+1)}, \varphi_l, \varphi_{(l+1)}) = \frac{[\theta(\varphi_l, \varphi_{(l+1)}) - \theta'(\varphi'_l, \varphi'_{(l+1)})]^2}{\theta(\varphi_l, \varphi_{(l+1)}) + \theta'(\varphi'_l, \varphi'_{(l+1)})}$$

where:

e3(φ'$_l$,φ'$_{(l+1)}$, φ$_l$,φ$_{(l+1)}$) is said bending costs;

l=1, 2, . . . , L;

L is the total number of said line segments in said polyline;

θ(φ$_l$,φ$_{(l+1)}$) is the angle between successive line segments φ$_l$ and φ$_{(l+1)}$; and θ'(φ$_l$,φ$_{(l+1)}$) is the angle between successive input line segments φ'$_l$ and φ$_{(l+1)}$.

17. The method of claim 13, wherein searching step includes calculating a polyline cost by determining the sum of the image cost component, the stretching cost component, and the bending cost component for each line segment in the polyline contour in accordance with the following relationship:

$$C(\varphi, L) = \sum_{l=1}^{L} e1(\varphi_l) + \alpha \sum_{l=1}^{L} e2(\varphi'_l, \varphi_l) + \beta \sum_{l=2}^{L} e3(\varphi'_{l-1}, \varphi'_l, \varphi_{(l-1)}, \varphi_l)$$

where:

C(φ,L) is said contour cost; and

α and β are weighting factors related to the expected relative degree of stretching and bending of said polyline, and said cost means stores said polyline with the smallest polyline cost with respect to each said image as said optimal contour.

* * * * *